United States Patent
Chan et al.

(10) Patent No.: US 9,438,339 B1
(45) Date of Patent: Sep. 6, 2016

(54) AUTOMATIC DETECTION OF INFRARED EXTENDER OR BLASTER

(71) Applicant: Google Inc., Mountain View, CA (US)

(72) Inventors: Yut Loy Chan, San Jose, CA (US); Michael Daniel Fuller, San Jose, CA (US)

(73) Assignee: Google Inc., Mountain View, CA (US)

( * ) Notice: Subject to any disclaimer, the term of this patent is extended or adjusted under 35 U.S.C. 154(b) by 437 days.

(21) Appl. No.: 14/053,739

(22) Filed: Oct. 15, 2013

(51) Int. Cl.
*G05B 11/01* (2006.01)
*H04N 5/44* (2011.01)
*H01R 13/66* (2006.01)
*H04B 10/114* (2013.01)

(52) U.S. Cl.
CPC .................. *H04B 10/1141* (2013.01)

(58) Field of Classification Search
CPC ................. G08C 19/16; G05B 11/01
USPC ....................................... 340/12.52
See application file for complete search history.

(56) References Cited

U.S. PATENT DOCUMENTS

| | | | |
|---|---|---|---|
| 7,764,190 B2 | 7/2010 | Mortensen | |
| 8,447,192 B2 | 5/2013 | Nunes | |
| 8,480,438 B2 * | 7/2013 | Mattson | H01R 13/641 439/676 |
| 2008/0303947 A1 * | 12/2008 | Ohnishi | H04N 5/60 348/558 |
| 2012/0210835 A1 | 8/2012 | Schmeits et al. | |
| 2013/0154812 A1 | 6/2013 | Richardson | |
| 2013/0329140 A1 * | 12/2013 | Silverberg | H04N 21/4432 348/734 |
| 2015/0049402 A1 * | 2/2015 | Fong | H02H 9/005 361/10 |

* cited by examiner

*Primary Examiner* — Jennifer Mehmood
*Assistant Examiner* — John Mortell
(74) *Attorney, Agent, or Firm* — Honigman Miller Schwartz and Cohn LLP

(57) ABSTRACT

A method for automatically detecting an infrared blaster or an infrared receiver includes detecting receipt of an infrared device by a media device. The media device has an internal infrared receiver and a processor. The method further includes determining if the infrared device is an infrared extender or an infrared blaster. When the infrared device is an infrared extender, the method includes disabling the internal infrared receiver and connecting the infrared device to the processor of the media device. When the infrared device is an infrared blaster, the method includes connecting the infrared device to the processor of the media device and not disabling the internal infrared receiver.

28 Claims, 12 Drawing Sheets

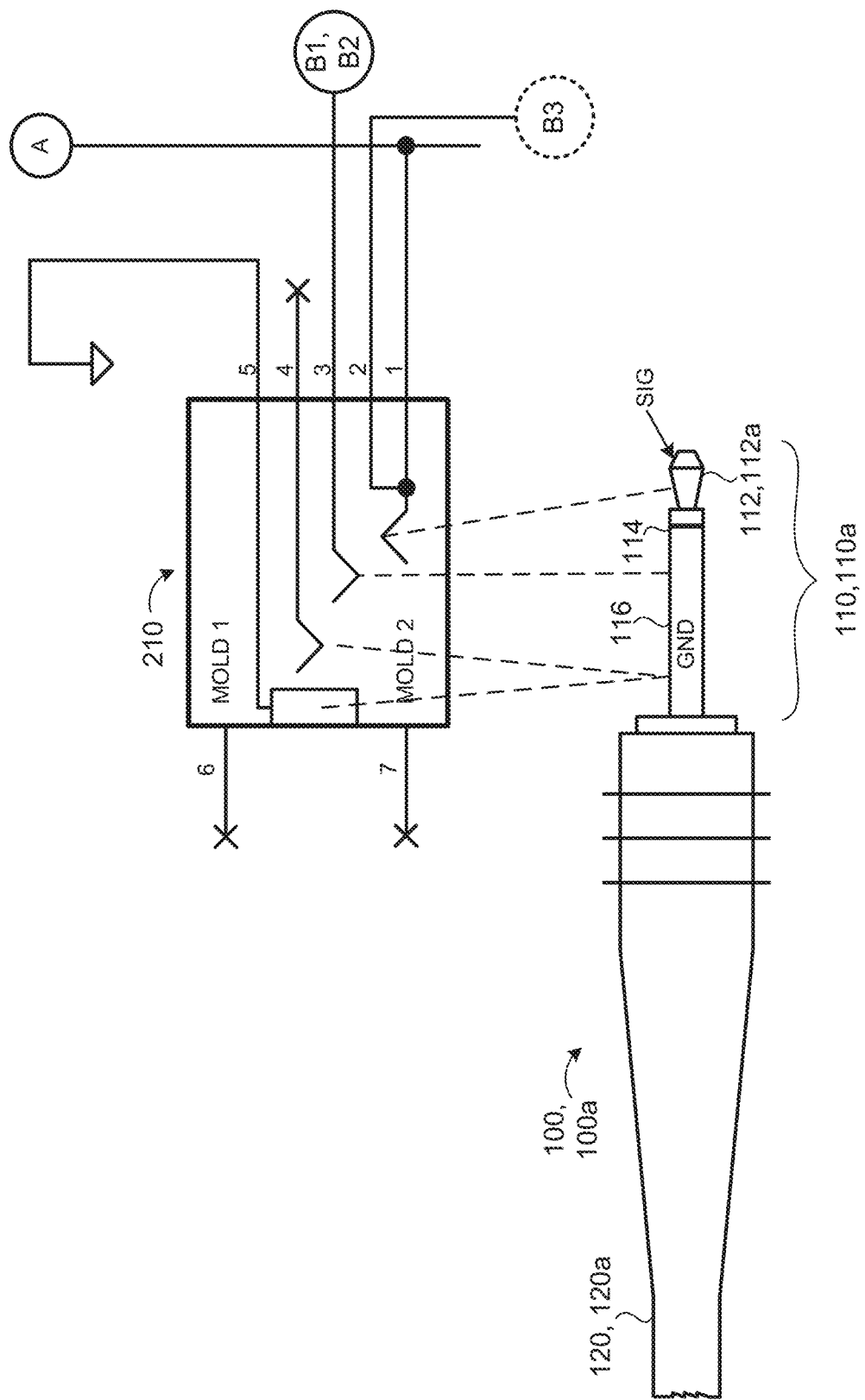

AUTOMATIC DETECTION OF INFRARED EXTENDER OR BLASTER

TECHNICAL FIELD

This disclosure relates to the automatic detection of an IR extender or an IR blaster.

BACKGROUND

Consumer electronic devices, such as televisions, audio equipment, video recorders, DVD players, video game consoles, and digital video recorders (DVR) are continually shrinking in size. Many consumers have one or more of these devices and prefer to place these devices out of sight to avoid clutter. This creates a challenge in the design of these electronics, since a remote control usually needs to be within a line-of-sight of a device receiver to communicate with the device. In some examples, an external receiver, such as an infrared extender, allows the consumer to control the device despite not having a line-of-sight.

Additionally, consumers may want to control their consumer electronics with a single remote control when possible. Consumer infrared devices use an infrared electromagnetic spectrum for wirelessly communicating with one another. These infrared devices are capable of communicating with more than one device at a time. Therefore, one remote control may control multiple devices, such as a television and DVR.

SUMMARY

One aspect of the disclosure provides a method for automatically detecting an infrared blaster or an infrared extender. The method includes detecting receipt of an infrared device by a media device. The media device has an internal infrared receiver and a processor. The method further includes determining if the infrared device is an infrared extender or an infrared blaster. When the infrared device is an infrared extender, the method includes disabling the internal infrared receiver and connecting the infrared device to the processor of the media device. When the infrared device is an infrared blaster, the method includes connecting the infrared device to the processor of the media device and not disabling the internal infrared receiver.

Implementations of the disclosure may include one or more of the following features. In some implementations, detecting receipt of an infrared device includes detecting an altered state of one or more electrical connections of a socket of the media device by a received connector of the infrared device. Additionally or alternatively, the method may include detecting a break in one or more electrical connections of the socket of the media device by the received connector of the infrared device.

In some examples, the method further includes determining if the infrared device is an infrared extender or an infrared blaster, based on one or more altered electrical connections of the socket of the media device. Additionally or alternatively, determining if the infrared device is an infrared extender or an infrared blaster may include detecting a logic high or a logic low on one electrical connection of the socket of the media device.

Another aspect of the disclosure provides a method for automatically detecting an infrared blaster or an infrared extender. The method includes detecting a connector received by a socket of a media device. The media device has an internal infrared receiver and a processor. The method further includes determining if the connector is an infrared extender or an infrared blaster. When the connector is an infrared extender, the method includes disabling the internal infrared receiver and connecting the connector to the processor of the media device. When the connector is an infrared blaster, the method includes connecting the connector to the processor of the media device and not disabling the internal infrared receiver.

In some examples, detecting the connector includes detecting an altered state of one or more electrical connections of the socket of the media device by the connector. Additionally or alternatively, the method may further include detecting a break in one or more electrical connections of the socket of the media device by the connector.

The method may also include determining if the infrared device is an infrared extender or an infrared blaster based on one or more altered electrical connections of the socket of the media device. Additionally or alternatively, determining if the infrared device is an infrared extender or an infrared blaster may include detecting a logic high or a logic low on one electrical connection of the socket of the media device.

In some implementations, if the infrared device is an infrared extender or the connector is of an infrared extender, the method includes receiving an infrared signal outside a line of sight of the media device. If the infrared device is an infrared blaster or the connector is of an infrared blaster, the method may further include receiving an infrared signal from a first remote device and sending the infrared signal to a second remote device. The infrared signal may include a command to control the second remote device.

Yet another aspect of the disclosure provides a method for automatically detecting an infrared blaster or an infrared extender. The method includes detecting a receipt of a connector of an infrared extender or an infrared blaster by a media device having a computing processor and an internal receiver. The method further includes executing a routine on the computing processor. The routine determines if the connector is of an infrared extender or an infrared blaster. When the connector is of an infrared extender, the routine causes the infrared extender to communicate with the processor and disables the internal receiver. When the connector is of an infrared blaster, the routine causes the infrared blaster to communicate with the processor and does not disable the internal receiver. In some implementations, the routine causes the media device to receive an infrared signal outside a line of sight of the media device, if the connector is of an infrared extender. If, however, the connector is an infrared blaster, the routine causes the media device to receive an infrared signal from a first remote device and send the infrared signal to a second remote device. The infrared signal includes a command to control the second remote device.

In some examples, detecting receipt of the connector includes detecting an altered state of one or more electrical connections of a socket of the media device by the received connector. Additionally or alternatively, the method may include detecting a break in one or more electrical connections of the socket of the media device by the received connector.

The method may further include determining if the infrared device is an infrared extender or an infrared blaster based on one or more altered electrical connections of the socket of the media device. Additionally or alternatively, determining if the infrared device is an infrared extender or an infrared blaster may include detecting a logic high or a logic low on one electrical connection of the socket of the media device.

Yet another aspect of the disclosure provides a media device that includes a processor, an internal receiver, a socket and a circuit. The internal receiver is in communication with the processor and is configured to receive an infrared signal. The socket receives a connector of an infrared extender or an infrared blaster. The circuit is in communication with the socket and the internal receiver. When the connector is of an infrared extender, the circuit connects the infrared extender to the processor and disables the internal receiver. When the connector is of an infrared blaster, the circuit connects the infrared blaster to the processor of the media device and does not disable the internal receiver. In some examples, the media device is configured to receive an infrared signal outside a line of sight of the media device when the connector is of an infrared extender. The media device may be configured to receive an infrared signal from a first remote device and send the infrared signal to a second remote device, if the connector is of an infrared blaster. The infrared signal includes a command to control the second remote device.

In some examples, the circuit detects receipt of an infrared device by detecting an altered state of one or more electrical connections of the socket by a received connector. Additionally or alternatively, the circuit may detect a break in one or more electrical connections of the socket by the received connector.

In some implementations, the circuit determines if the connector is an infrared extender or an infrared blaster based on one or more altered electrical connections of the socket. Additionally or alternatively, the circuit may determine if the connector is an infrared extender or an infrared blaster by detecting a logic high or a logic low on one electrical connection of the socket.

For any of the above implementations, the infrared device or the connector may include a 3.5 mm audio jack. The media device may be a television, a set-top-box, a digital-video-recorder, or a cable box. Other devices are possible as well.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3A is a schematic view of an IR blaster connector communicating with an exemplary socket of an electronic device.

Like reference symbols in the various drawings indicate like elements.

DETAILED DESCRIPTION

Figure 1A:
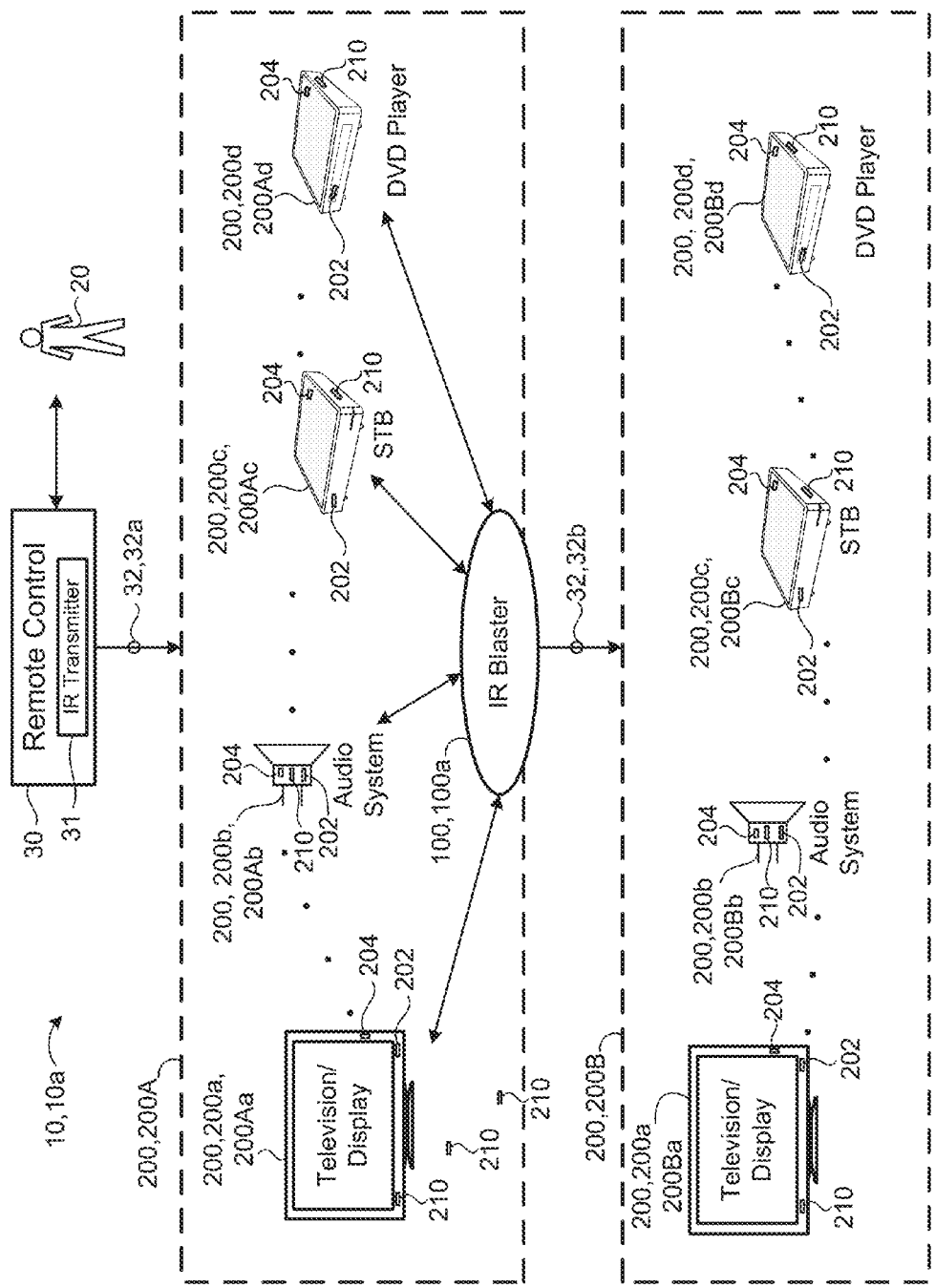
FIG. 1A is a schematic view of an exemplary communication system having an IR blaster.
Figure 1B:
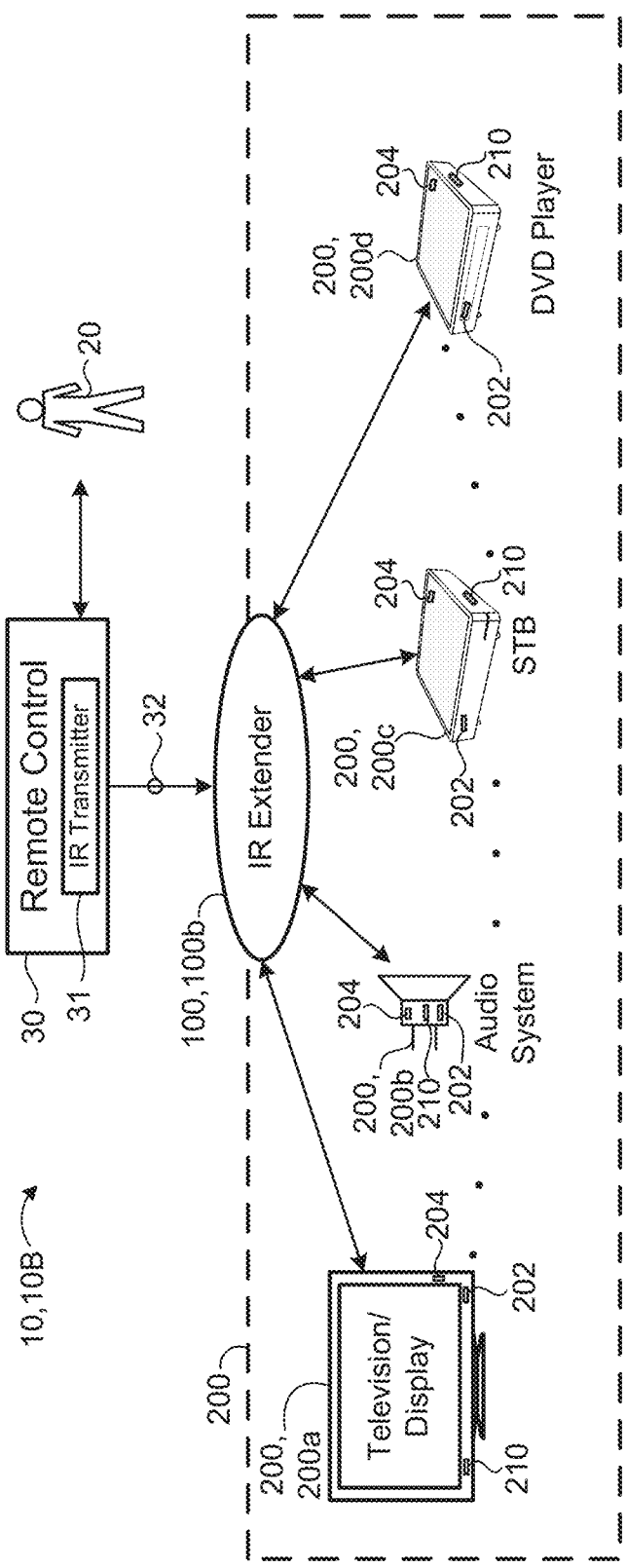
FIG. 1B is a schematic view of an exemplary communication system having an IR extender.
Figure 2A:
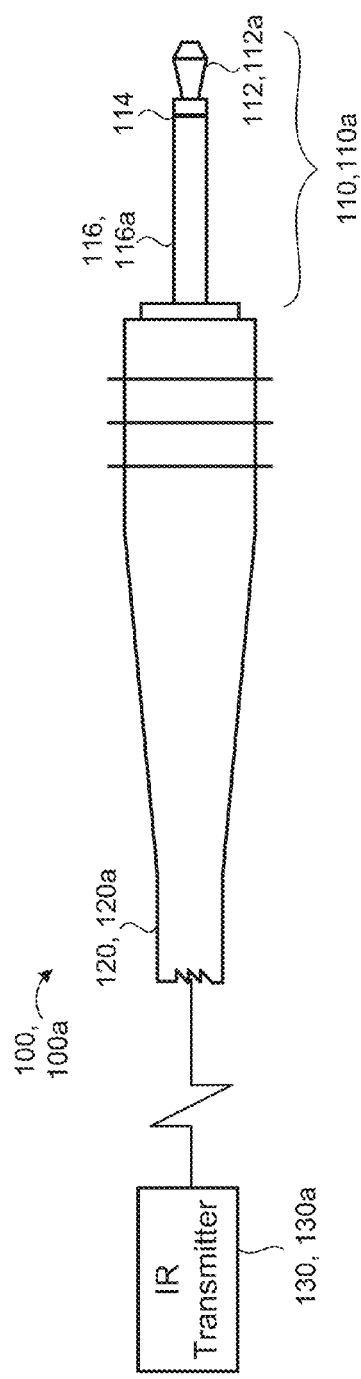
FIG. 2A is a front view of an IR blaster connector for connecting to an exemplary electronic device.
Figure 2B:
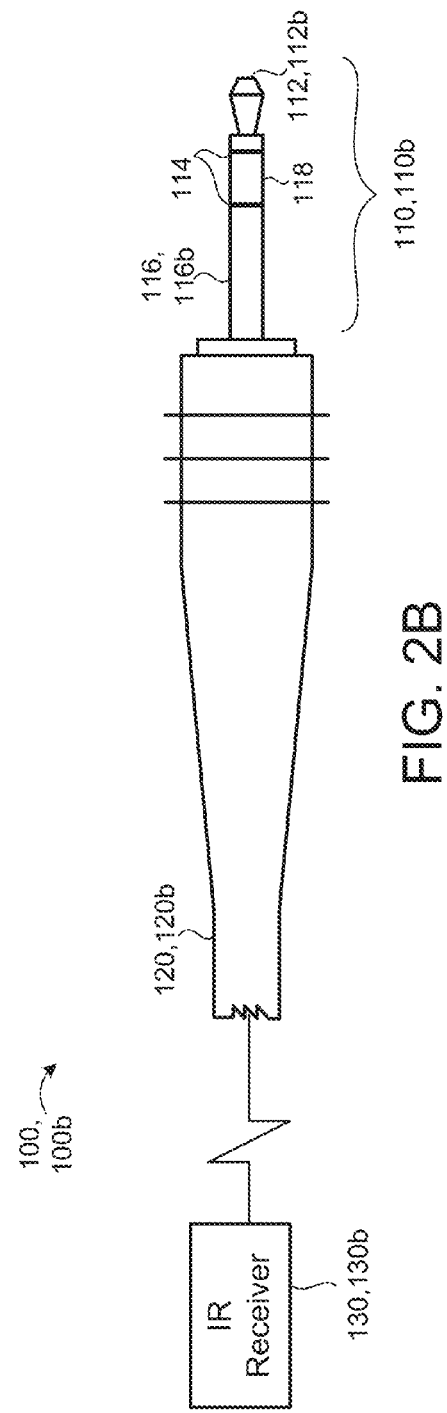
FIG. 2B is a front view of an IR extender connector for connecting to the exemplary electronic device.

Referring to FIGS. 1A and 2B, in some implementations, a communication system 10 for communicating between a user 20 and one or more electronic devices 200, via a remote control 30, includes an infrared (IR) device 100 having a connector 110. The infrared device 100 may be an IR blaster 100a (e.g., as shown in FIGS. 1A, 2A, 3A, and 4-6) or an IR extender 100b (e.g., as shown in FIGS. 1B, 2B, and 3B-6). In some examples, the user 20 has a remote control 30 capable of controlling functions and features of one or more electronic devices 200. In some examples, the user 20 programs or configures the remote control 30 to control devices 200, such as a television 200a, an audio system 200b, a set-top-box (STB) 200c, or a DVD player 200d. The remote control 30 includes an IR transmitter 31 for transmitting an IR signal 32 to the device 200 that the user 20 wants to control. In most instances, the IR transmitter 31 is a light emitting diode (LED) built into a front pointing end of the remote control 30. The IR signal includes infrared light pulses where each pulse pattern is unique to a specific button or command on the remote control 30. An electronic device 200 associated with the remote control 30 or capable of being controlled by the remote control 30 receives the signal through an IR receiver 202. Therefore, a line-of-sight from the IR transmitter 31 of the remote control 30 to the IR receiver 202 of the device 200 is desired to establish communication between the remote control 30 and the device 200. The electronic device 200 may include a processor 204 in communication with the internal IR receiver 202 for processing information received by the remote control 30. The processor 204 interprets the received signal 32 into a command that modifies a status of the device 200.

An IR blaster 100a, as shown in FIG. 1A, extends a remote IR signal 32a and allows the control of other devices 200b that may be located behind cabinets or in other rooms. An IR blaster 100a allows a user 20 to control a device 200 without using a remote control associated with the device 200. Therefore, one remote control 30 may be used to control several devices 200. A user 20 connects the IR blaster 100a to one of the controlling consumer electronics 200A, which allows the controlling consumer electronic 200A device 200A to control one or more other controlled devices 200B. For example, the IR blaster 100a may be connected to the STB 200Ac. A user 20 may send a signal 32a to the STB 200Ac using the remote 30. The STB 200Ac receives the signal 32a and re-transmits the signal 32b through the IR blaster 100a to one of the other controlled devices 200B that the user 20 wants to control (e.g., the audio system 200Bb). This allows for the placement of the audio system 200Bb in a cabinet that is not within close proximity of the STB 200Ac and still allows the user 20 to control the controlled devices 200B through the STB 200Ac. In this case, the STB 200Ac is the controlling device 200A, since the IR blaster 100a connects to it and controls other devices 200B. The controlling device 200A may be any device 200 that a user 20 connects to the IR blaster 100a for receiving a first signal 32a and re-transmitting the signal 32b. The IR blaster 100a includes one or more electrical cables 120a (FIG. 2A) connected to an IR LED 130a. A user 20 may place the IR LED on or near an IR sensor of the controlled device 200B. The long cable 120a allows for the placement of the controlling device 200A and the controlled device 200B at a distance from each other.

Referring to FIG. 1B, a user 20 connects an IR extender 100b to a device 200 that includes an IR receiver 202. The device 200 may be positioned in a cabinet or further away from the remote control 30. The IR receiver 202 of the device 200 may not have a line-of-sight with the IR transmitter 31 of the remote control 30; therefore, the IR receiver 202 of the device 200 is out-of-sight from the IR transmitter 31 of the remote control 30. The IR extender 100b includes a cable 120b (FIG. 2B), a connector 110b, and an IR receiver 130b. The connector 110b connects to the out-of-sight device 200, and a user 20 places the IR receiver 202 in a location capable of receiving the IR signals 32 from the remote control 30. The cable 120b of the IR extender 100b allows for a user 20 to place the out-of-sight device 200 in a cabinet or away from the remote control 30. Therefore, the IR extender 100b receives the remote signal 32 and sends it to the device 200 to be controlled via the cable 120b.

A user 20 may use an IR blaster 100a or an IR extender 100b based on the devices 200 the user 20 has and based on the setup and location of the devices 200 with respect to one another. Most electronic devices 200 are configured to include an IR out socket for connecting an IR blaster 100a and another IR in socket for connecting an IR extender 100b. However, as shown in FIGS. 1A-6, an electronic device 200 may include one socket 210 capable of receiving a connector 110 of an IR blaster 100a or an IR extender 100b and automatically configuring the device 200 to communicate with the IR blaster 100a or the IR extender 100b. Having one socket 210 instead of two saves both real-estate on the device 200 and cost. Moreover, the socket 210 is in communication with the processor 204.

Referring to FIGS. 2A and 2B, in some implementations, the connector 110 is a 3.5 mm (approximately ⅛ inch) audio jack having two, three, or four contacts. The connector 110 includes a tip 112, ring insulators 114, and a sleeve 116 (usually ground). In some examples, the connector 110 includes a ring 118, as shown in FIG. 2B. Usually, the tip 112 and the ring 118 each carry a signal.

Referring to FIGS. 2A, 3A, and 4-6, an IR blaster 100a has a connector portion 110a, a blaster portion 130a, and a cable portion 120a that connects the connector portion 110a to the blaster portion 130a (IR transmitter). The connector portion 110a of the IR blaster 100a includes a tip 112a, which is a signal pin, and a ring insulator 114 for insulating the signal 32 from the sleeve 116a (ground). FIG. 3A shows the pins of the IR blaster connector portion 110a as they are in contact with pins 1-5 of the receiver socket 210 of an electronic device 200 (when the user 20 inserts the connector in the socket). The socket includes a first pin 1 and a second pin 2 that are in contact with each other. Once the receiver socket 210 receives the IR blaster connector 110a, the connector 110 breaks the contact between the first pin 1 and the second pin 2. The first pin 1 connects to the tip 112a of the IR blaster connector 110a and the second pin 2 is floating (i.e., since it is not connected to any other connector). A third pin 3, a fourth pin 4, and a fifth pin 5 of the socket receiver 210 are in contact with the sleeve 116a of the IR blaster connector 110a.

Figure 3B:
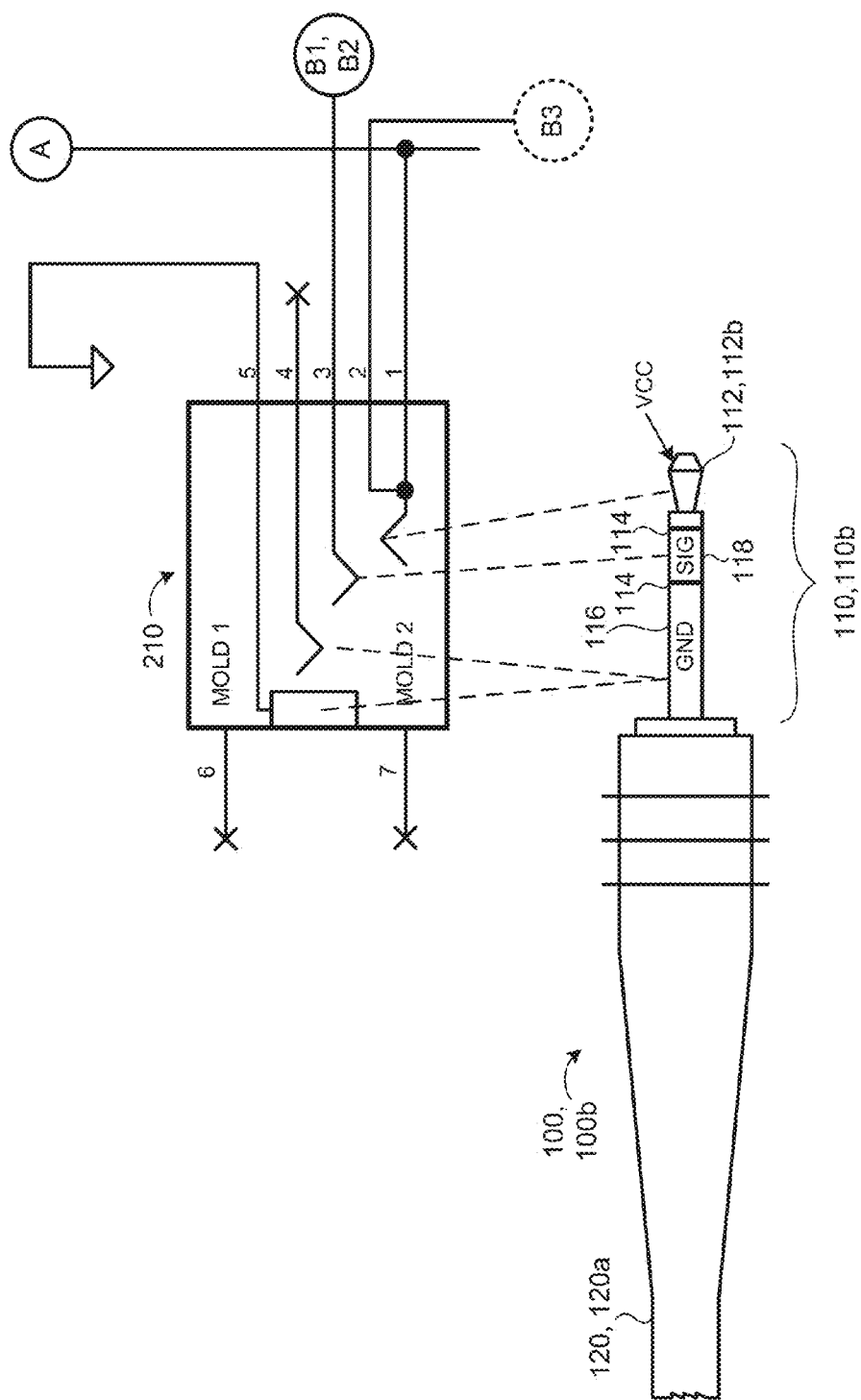
FIG. 3B is a schematic view of an IR extender connector communicating with an exemplary socket of an electronic device.
Figure 4:
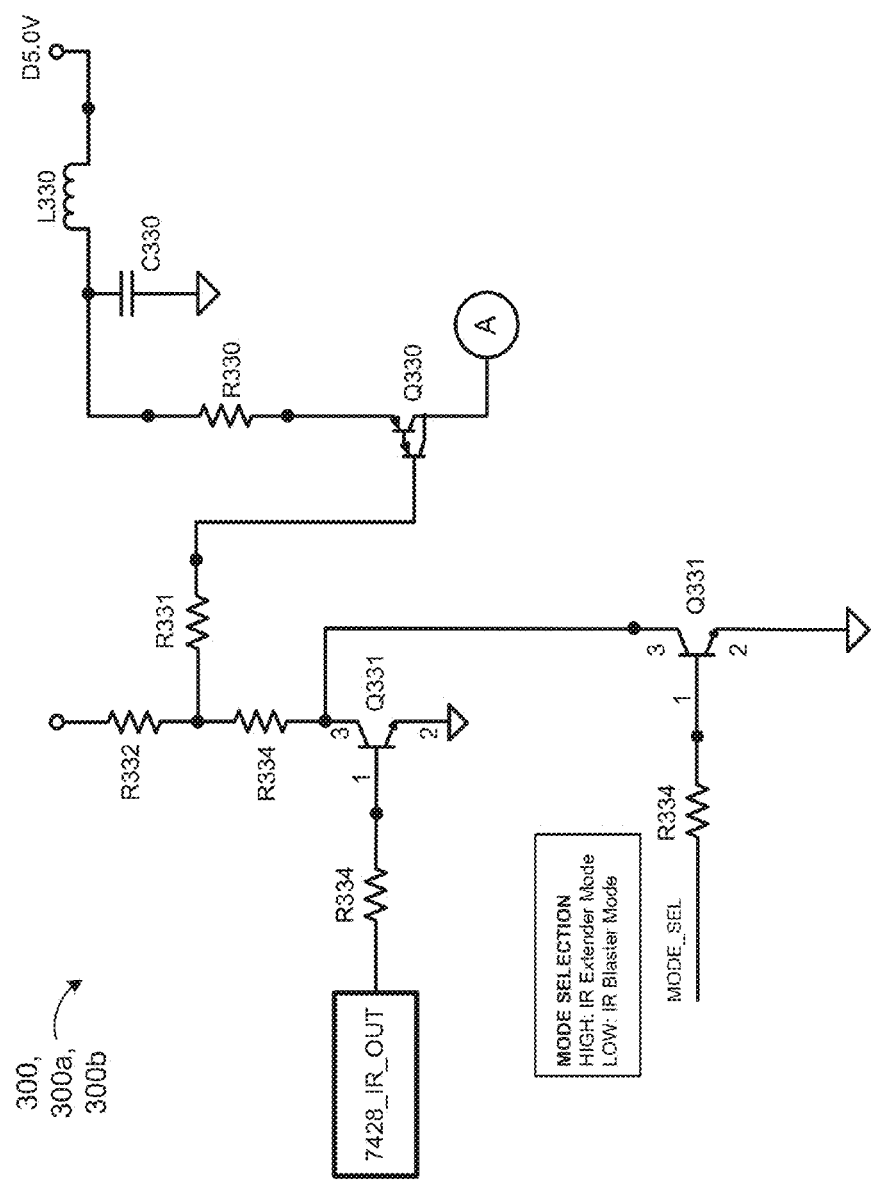
FIGS. 4 and 5 are schematic views of an exemplary circuit associated with the socket of the electronic device.
Figure 5:
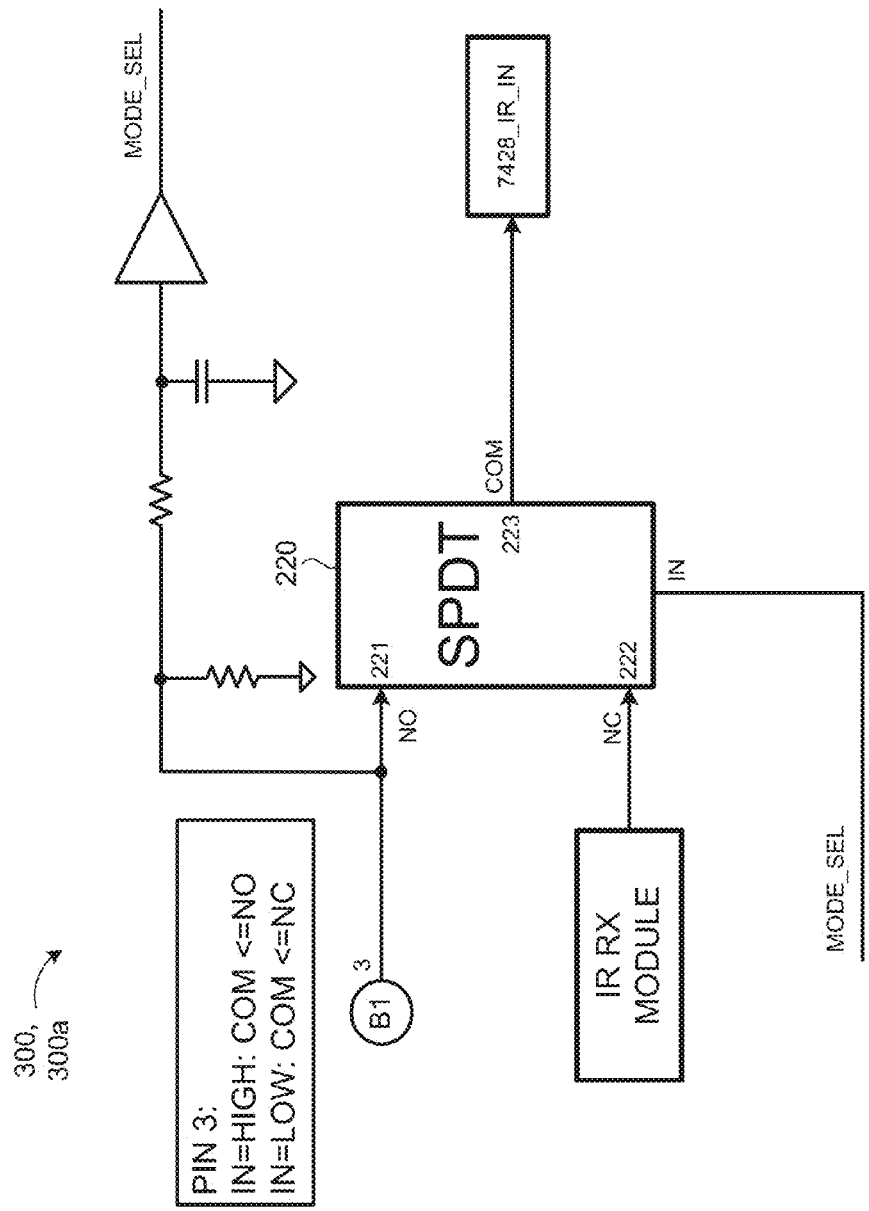
Figure 6:
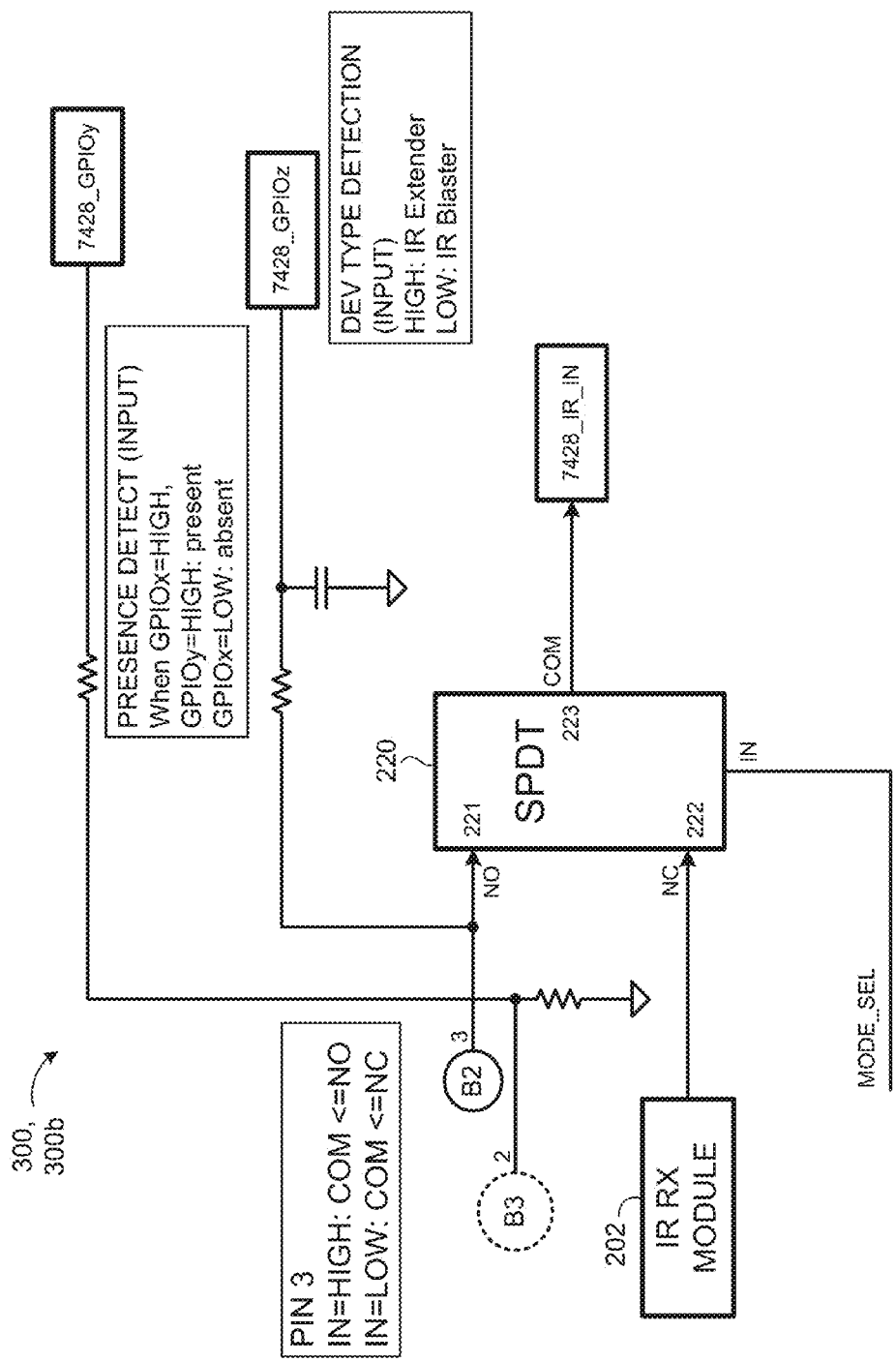
FIG. 6 is a schematic view of an exemplary circuit associated with the socket of the electronic device controlled by software.

Referring to FIGS. 2B and 3B-6, in some implementations, an IR extender 100b includes a connector 110b, an extender portion 130b, and a cable portion 120b for connecting the connector 110b to the extender portion 130b (IR receiver). The connector portion 110b of the IR extender 100b includes a tip 112b, which is a power pin, and two ring insulators 114 surrounding a ring 118. The ring 118 is a signal pin. The connector 110b also includes a sleeve 116b that is a ground pin. The power tip 112b may be a positive supply voltage ($V_{CC}$). FIG. 3B shows the pins 1-5 of the IR extender connector portion 110b as they are in contact with the pins 1-5 of the receiver socket 210. As explained above, the first pin 1 and the second pin 2 of the socket receiver 210 are in contact with each other prior to receiving the IR extender connector 110b (e.g., the first and second pins 1, 2 may be spring biased to contact each other or a common conductive surface). Once the receiver socket 210 receives the IR extender connector 110b, the connector 110 breaks the contact between the first pin 1. The third pin 3 is in contact with the ring 118 (carrying the signal), and the fourth pin 4 and the fifth pin 5 are in contact with the sleeve 116b of the IR extender connector 110b.

The difference between connecting an IR blaster 100a and an IR extender 100b to the socket 210 is when the receiver socket 210 receives an IR blaster connector 110a, the IR blaster connector 110a causes the first pin 1 to connect to a signal pin 112a of the IR blaster connector 110a and connection of pins 3-5 to the ground pin 116a. This is different from when the socket 210 receives an IR extender connector 110b, where the IR extender connector 110b causes the first pin 1 of the socket 210 to connect to a power pin 112b, the third pin 3 to connect to the signal pin 118, and the fourth pin 4 and the fifth pin 5 to connect to the ground pin 116b. The circuitry 300, 300a, 300b shown in the figures is used to automatically detect if the inputted IR device 100 is an IR blaster 100a or an IR extender 100b. The automatic detection is mainly due to the difference in the connector pins between the IR blaster connector 110a and the IR extender connector 110b.

Referring back to FIGS. 2A-6, the first pin 1 and the second pin 2 are in contact with each other and form a switch connector prior to receiving an IR connector 110. In addition, since the circuit 300 applies a 5V to the first pin 1, and the first pin connects to the second pin 2, when no connector 110 is present the second pin 2 is at 5 V as well. When a user 20 inputs the IR connector 110 into the receiver socket 210, the tip 112 of the connector 110 breaks the connection between the first pin 1 and the second pin 2. The first pin 1 connects to the tip 112 of the receiver socket 210, and the second pin 2 is floating (i.e., since it is not connected to any other connector). Therefore, a break in the connection between the first pin 1 and the second pin 2 causes the processor 204 to detect that a user 20 inserted an IR device 100 (e.g., an IR blaster 100a or an IR extender 100b) in the receiver socket 210 via a connector 110 (e.g., an IR blaster connector 110a or an IR extender connector 110b). In addition, when the user 20 inserts the connector 110 in the socket 210 a pull-down on the circuit board 300 occurs due to the breaking of the connection between the first pin 1 and the second pin 2, which causes a logic low at the second pin 2 when a connector 110 is present.

Once the circuit 300 detects that an IR connector 110 is present in the socket receiver 210, the circuit 300 determines if the inputted IR connector 110 is an IR blaster connector 110a or an IR extender connector 110b. The processor 204 considers the third pin 3 for making that determination. As shown, the third pin 3 of the socket 210 connects to an SPDT (single-pole, double throw) switch 220, which connects either of two terminals 221, 222 to one common terminal 223. Single pole refers to the number of separate circuits controlled by a switch, and the number of throws is the number of positions that the switch can adopt. The terminals in the SPDT switch 220 remain in one state unless actuated. Therefore, the contacts (or terminals) are either normally open (NO) until closed by the operation of the switch, or normally closed (NC) and opened by the switch action. The SPDT switch 220 is capable of switching between enabling the internal IR receiver 202 and enabling the IR extender 100*b* (by disabling the internal IR receiver 202). Therefore, if the third pin 3 connects to ground or the third pin 3 does not connect to anything, the SPDT switch 220 closes at terminal 222 allowing the internal IR receiver 202 to stay enabled. However, if a user plugs the IR extender 100*b* into the socket 210, then pin 3 of the socket 210 connects to the ring 118 (carrying the signal 32) of IR extender connector 110*b*. Therefore, the NC terminal 222 of the SPDT 220 opens and the NO terminal 221 closes. This disables the internal IR receiver 202 and connects the IR extender 100*b* that replaces the internal IR receiver 202. In some examples, the signal level at the ring 118 of the IR extender connector 110*b* is nominally 3.3 Volts (which the processor 204 considers as a voltage high). Therefore, when the processor 204 detects a voltage high at the third pin 3, the processor 204 recognizes that a user 20 connected an IR extender connector 110*b* to the socket receiver 210; however, if the processor 204 detects a logic low then it recognizes that a user connected an IR blaster connector 110*a* (only if the processor previously detected a connector 110 based on the first pin 1). A logic low also indicates to the processor 204 that nothing is connected to the socket 210. Thus, a logic low caused by either the IR blaster connector 110*a* or no connection indicates that the internal IR receiver 202 should not be disconnected.

Therefore, when the processor 204 detects a connector 110, a logic low at the third pin 3 indicates that a user 20 connected an IR blaster 100*a* to the socket 210. This causes the third pin 3 to be grounded and maintaining the use of the internal IR receiver 202. The IR blaster 100*a* connects to the processor 204 of the device 200. However, if the processor 204 detects a logic high at the third pin 3, the processor 204 determines that a user 20 connected an IR extender 100*b* to the socket 210, which leads to the third pin 3 closing the first terminal of the SPDT 220 switch, which disables the internal IR receiver 202. The IR extender 100*b* connects to the processor 204 of the device 200.

In some implementations, the circuit 300 detects receipt of an infrared device 100 by detecting an altered state of one or more electrical connections (e.g., first, second, or third pins 1, 2, 3) of the socket 210 by a received connector 110. An altered state may be a detection of a break in one or more electrical connections of the socket 210 by the received connector 110, such as a break in the connection between the first pin 1 and the second pin 2, as previously described. Moreover, the circuit 300 determines if the connector 110 is of an infrared extender 100*b* or an infrared blaster 100*a* based on one or more altered electrical connections of the socket 210. The circuit 300 may determine if the connector 110 is an infrared extender 100*b* or an infrared blaster 100*a* by detecting a logic high or a logic low on one electrical connection of the socket 210.

The automatic detection of an IR blaster 100*a* or an IR extender 100*b* may be established through the circuit 300*a* shown in FIGS. 3A-5 or by a combination of a circuit and software elements as shown in the circuit 300*b* of FIGS. 3A-4, and 6. A general-purpose input/output (GPIO) is a generic pin on an integrated circuit 300 whose behavior may be controlled by a program. Therefore, software may be used with the GPIO as shown in the figures to detect the logic high or the logic low of the first, second and third pins 1-3.

Figure 7:
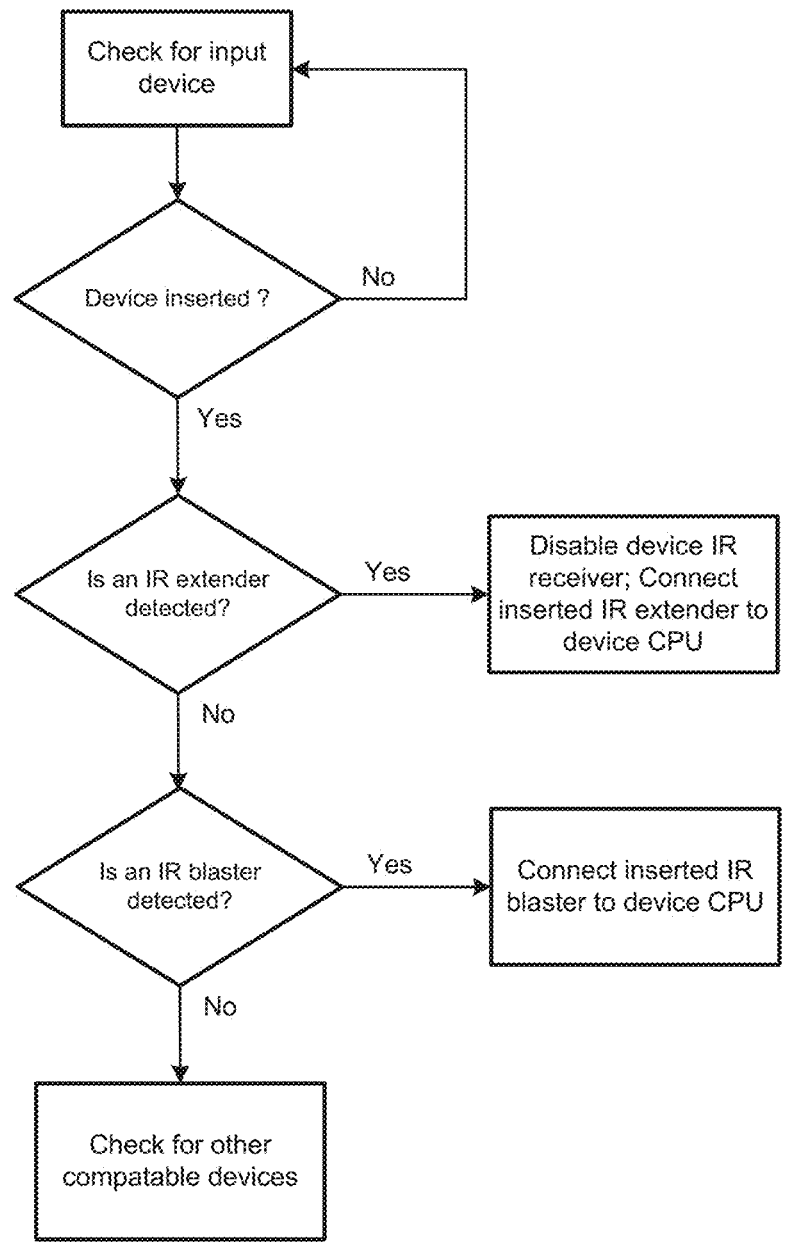
FIG. 7 is a flow chart of an exemplary arrangement of operations for automatically detecting an infrared blaster or an infrared extender.

Referring to FIG. 7, in some implementations, an electronic device 200 may be configured to receive a connector 110. The electronic device 200 having a processor 204 checks for any inserted connectors 110. If the processor 204 does not detect a connector 110, the device 200 keeps checking until the device 200 receives an inserted connector 110. The device 200 then checks if the inserted device 100 is an IR extender 100*b*, if so the device 200 disables an internal IR receiver 202 and connects the inserted IR extender connector 110*b* to the processor 204. If the connector 110 is not of an IR extender 100*b*, then the device 200 checks if the connector 110 is of an IR blaster 100*a*. If the connector 110 is a connector 110*a* of an IR blaster 100*a*, then the IR blaster 100*a* connects to the processor 204 of the device 200. If the connector 110 is not of an IR extender 100*b* or of an IR blaster 100*a*, then the device 200 checks if another compatible device is connected.

Figure 8:
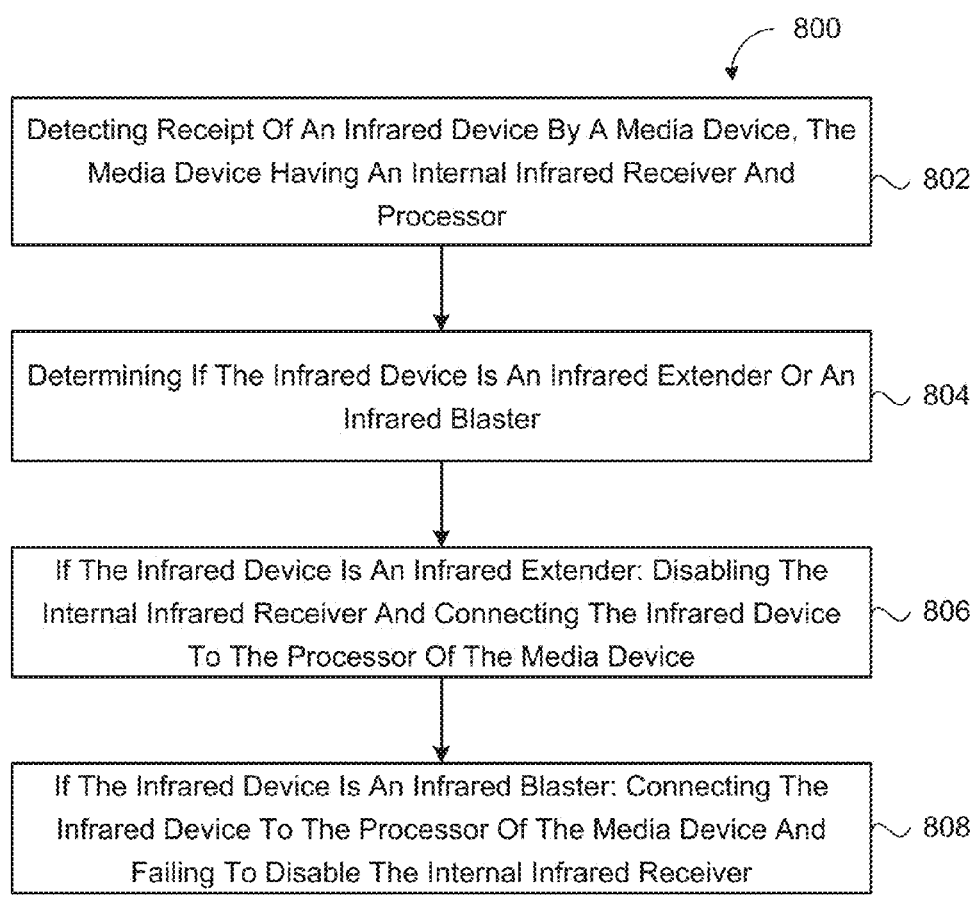
FIGS. 8-10 are schematic views of exemplary arrangements of operations for automatically detecting an infrared blaster or an infrared extender.

FIG. 8 provides a method 800 for automatically detecting an IR blaster 100*a* or an IR extender 100*b*. The method 800 includes detecting 802 receipt of an IR device 100 by a media device 200, such as a television 200*a*, an audio system 200*b*, a set-top-box (STB) 200*c*, or a DVD player 200*d*. The media device 200 has an internal IR receiver 202 and a processor 204. The method 800 further includes determining 804 if the IR device 100 is an IR blaster 100*a* or an IR extender 100*b*. When the IR device 100 is an IR extender 100*b*, the method 800 includes disabling 806 the internal IR receiver 202 and connecting the IR device 100 to the processor 204 of the media device 200. When the IR device 100 is an IR blaster 100*a*, the method 800 includes connecting 808 the IR device 100 to the processor 204 of the media device 200 and not disabling the internal IR receiver 202, which means the internal IR device 200 keeps receiving signals from the remote control 30.

Figure 9:
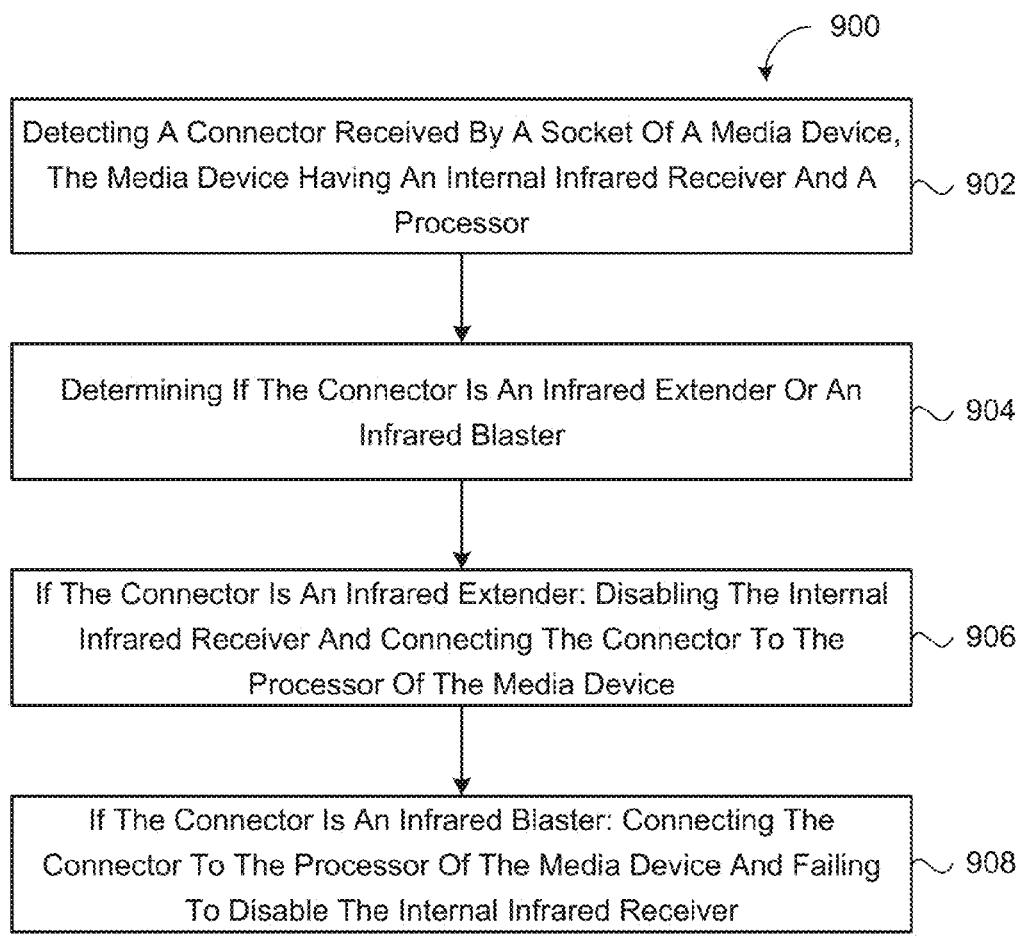

FIG. 9 provides a method 900 for automatically detecting an IR blaster 100*a* or an IR extender 100*b*. The method 900 includes detecting 902 a connector 110 received by a socket 210 of a media device 200. The media device 200 has an internal IR receiver 202 and a processor 204. The method 900 further includes determining 904 if the connector 110 is an IR extender 100*b* or an IR blaster 100*a*. When the connector 110*b* is an IR extender 100*b*, the method 900 includes disabling 906 the internal IR receiver 202 and connecting the connector 110*b* to the processor 204 of the media device 200. When the connector 110*a* is an IR blaster 100*a*, the method 900 includes connecting 908 the connector 110*a* to the processor 204 of the media device 200 and not disabling the internal IR receiver 202.

In some implementations, if the IR device 100 is an IR extender 100*b* or the connector 110*b* is of an IR extender 100*b*, the method 800, 900 includes receiving an IR signal outside a line-of-sight of the media device 200. If the IR device 100 is an IR blaster 100*a* or the connector 110*a* is of an IR blaster 100*a*, the method 800, 900 may further include receiving an IR signal 32*a* from a first remote device 200A and sending the IR signal 32*b* to a second remote device 200B. The IR signal 32 may include a command to control the second remote device 200B.

Figure 10:
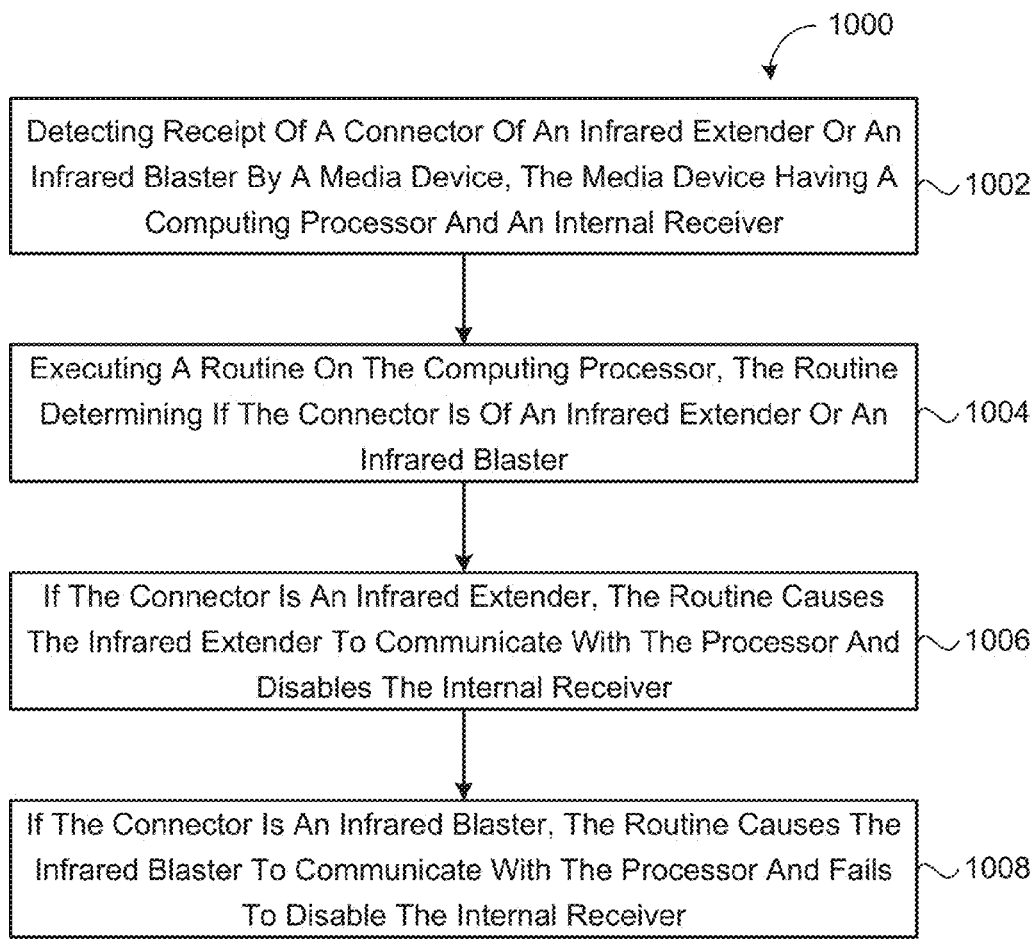

FIG. 10 provides a method 1000 for automatically detecting an IR blaster 100*a* or an IR extender 100*b*. The method 1000 includes detecting 1002 receipt of a connector 110 of an IR extender 100*b* or an IR blaster 100*a* by a media device 200 having a computing processor 204 and an internal IR receiver 202. The method 1000 further includes executing 1004 a routine on the computing processor 204. The routine determines if the connector 110 is of an extender 100*b* or an IR blaster 100*a*. When the connector 110*b* is of an IR extender 100*b*, the routine causes 1006 the IR extender 100*b* to communicate with the processor 204 and disables the internal IR receiver 202. When the connector 110*a* is an IR blaster 100*a*, the routine causes 1008 the IR blaster 100*a* to communicate with the processor 204 and does not disable the internal IR receiver 202. In some implementations, the routine causes the media device 200 to receive an IR signal outside a line of sight of the media device 200, if the connector 110*b* is of an IR extender 100*b*. If, however, the connector 110*a* is an IR blaster 100*a*, the routine causes the media device 200 to receive an IR signal from a first remote device and send the IR signal to a second remote device. The IR signal includes a command to control the second remote device.

Referring back to FIGS. 8-10, in some examples, detecting receipt 802, 902, 1002 of an infrared device 100 or a connector 110 includes detecting an altered state of one or more electrical connections (e.g., first, second, or third pins 1, 2, 3) of a socket 210 of the media device 200 by the received connector 110 of the infrared device 100. The method 800, 900, 1000 may include detecting a break in one or more electrical connections of the socket 210 of the media device 200 by the received connector 110 of the infrared device 100. A break may be a break in the connection between the first pin 1 and the second pin 2 as previously described.

In some examples, the method 800, 900, 1000 further includes determining if the infrared device 100 or the connector 110 is of an infrared extender 110*b* or an infrared blaster 110*a* based on one or more altered electrical connections of the socket 210 of the media device 200. Determining 804, 904, 1004 if the infrared device 100 or connector 110 is of an or an infrared extender 100*b* or an infrared blaster 100*a* may include detecting a logic high or a logic low on one electrical connection of the socket 210 of the media device 200. For example, a logic high detected at the third pin 3 indicated that an IR extender 100*b* is connected, while a logic low at the third pin 3 indicated that an IR blaster 100*a* is connected.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, non-transitory memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a non-transitory memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for automatically detecting an infrared blaster or an infrared extender, the method comprising:
    detecting receipt of an infrared device by a media device when a socket of the media device receives a connector of the infrared device, the media device having an internal infrared receiver and a processor; and
    determining whether the infrared device is an infrared extender or an infrared blaster by detecting a logic high or a logic low on an electrical connection of the socket of the media device by the received connector of the infrared device;
    wherein when the logic high on the electrical connection of the socket of the media device is detected:
        determining that the infrared device is the infrared extender;
        disabling the internal infrared receiver; and
        connecting the infrared device to the processor of the media device; and
    wherein when the logic low on the electrical connection of the socket of the media device is detected:
        determining that the infrared device is the infrared blaster; and
        connecting the infrared device to the processor of the media device and not disabling the internal infrared receiver.

2. The method of claim 1, wherein detecting receipt of the infrared device comprises detecting an altered state of one or more electrical connections of the socket of the media device by the received connector of the infrared device.

3. The method of claim 2, further comprising detecting a break in one or more electrical connections of the socket of the media device by the received connector of the infrared device.

4. The method of claim 1, wherein the infrared device comprises a 3.5 mm audio jack.

5. The method of claim 1, wherein the media device comprises one of a television, a set-top-box, a digital-video-recorder, or a cable box.

6. The method of claim 1, further comprising, when the infrared device is the infrared extender, receiving an infrared signal outside a line of sight of the media device.

7. The method of claim 1, further comprising, when the infrared device is the infrared blaster:
receiving an infrared signal from a first remote device; and
sending the infrared signal to a second remote device;
wherein the infrared signal comprises a command to control the second remote device.

8. A method for automatically detecting an infrared blaster or an infrared extender, the method comprising:
detecting a connector received by a socket of a media device, the media device having an internal infrared receiver and a processor; and
determining whether the connector is of the infrared extender or the infrared blaster by detecting a logic high or a logic low on an electrical connection of the socket of the media device by the received connector;
wherein when the logic high on the electrical connection of the socket of the media device is detected:
determining that the connector is of the infrared extender;
disabling the internal infrared receiver; and
connecting the connector to the processor of the media device; and
wherein when the logic low on the electrical connection of the socket of the media device is detected:
determining that the infrared device is infrared blaster; and
connecting the connector to the processor of the media device and not disabling the internal infrared receiver.

9. The method of claim 8, wherein detecting the connector comprises detecting an altered state of one or more electrical connections of the socket of the media device by the connector.

10. The method of claim 9, further comprising detecting a break in one or more electrical connections of the socket of the media device by the connector.

11. The method of claim 9, wherein the connector comprises a 3.5 mm audio jack.

12. The method of claim 9, wherein the media device comprises one of a television, a set-top-box, a digital-video-recorder, or a cable box.

13. The method of claim 9, further comprising, when the connector is of the infrared extender, receiving an infrared signal outside a line of sight of the media device.

14. The method of claim 9, further comprising, when the connector is of the infrared blaster:
receiving an infrared signal from a first remote device; and
sending the infrared signal to a second remote device;
wherein the infrared signal comprises a command to control the second remote device.

15. A media device comprising:
a processor;
an internal receiver in communication with the processor and configured to receive an infrared signal;
a socket for receiving a connector of an infrared extender or an infrared blaster; and
a circuit in communication with the socket and the internal receiver, the circuit determining whether the connector is of the infrared extender or the infrared blaster by detecting a logic high or a logic low on an electrical connection of the socket of the media device by the received connector;
wherein when the logic high on the electrical connection of the socket of the media device is detected:
determining that the connector is of the infrared extender;
disabling the internal receiver; and
connecting the infrared extender to the processor; and
wherein when the logic low on the electrical connection of the socket of the media device is detected:
determining that the connector is of the infrared blaster; and
connecting the infrared blaster to the processor of the media device and not disabling the internal receiver.

16. The device of claim 15, wherein the circuit detects receipt of an infrared device by detecting an altered state of one or more electrical connections of the socket by the received connector.

17. The device of claim 16, wherein the circuit detects a break in one or more electrical connection of the socket by the received connector.

18. The device of claim 15, wherein the connector comprises a 3.5 mm audio jack.

19. The device of claim 15, wherein the media device comprises one of a television, a set-top-box, a digital-video-recorder, or a cable box.

20. The device of claim 15, wherein the media device is configured to receive the infrared signal outside a line of sight of the media device when the connector is of an infrared extender.

21. The device of claim 15, wherein when the connector is of the infrared blaster, the media device is configured to:
receive the infrared signal from a first remote device; and
send the infrared signal to a second remote device, the infrared signal comprising a command to control the second remote device.

22. A method for automatically detecting an infrared blaster or an infrared extender, the method comprising:
detecting a receipt of a connector of an infrared extender or an infrared blaster by a socket of a media device having a computing processor and an internal receiver; and
executing a routine on the computing processor, the routine configured to determine whether the connector is of the infrared extender or the infrared blaster by detecting a logic high or a logic low on an electrical connection of the socket of the media device by the received connector;
wherein when the logic high on the electrical connection of the socket of the media device is detected:
determining that the connector is of the infrared extender;
disabling the internal receiver; and
connecting the infrared extender to the computing processor of the media device; and
wherein when the logic low on the electrical connection of the socket of the media device is detected:
determining that the connector is of the infrared blaster; and
connecting the infrared blaster to the computing processor of the media device.

23. The method of claim 22, wherein detecting receipt of the connector comprises detecting an altered state of one or more electrical connections of the socket of the media device by the received connector.

24. The method of claim 23, further comprising detecting a break in one or more electrical connections of the socket of the media device by the received connector.

25. The method of claim 22, wherein the connector comprises a 3.5 mm audio jack.

26. The method of claim 22, wherein the media device comprises one of a television, a set-top-box, a digital-video-recorder, or a cable box.

27. The method of claim 22, wherein when the connector is of an infrared extender, the routine is configured to cause the media device to receive an infrared signal outside a line of sight of the media device.

28. The method of claim 22, wherein when the connector is of an infrared blaster, the routine is configured to cause the media device to:
   receive an infrared signal from a first remote device; and
   send the infrared signal to a second remote device, the infrared signal comprises a command to control the second remote device.

* * * * *